H. PASSOW.
APPARATUS FOR PRODUCING CEMENT.
APPLICATION FILED MAR. 24, 1909.
1,051,844.
Patented Jan. 28, 1913.
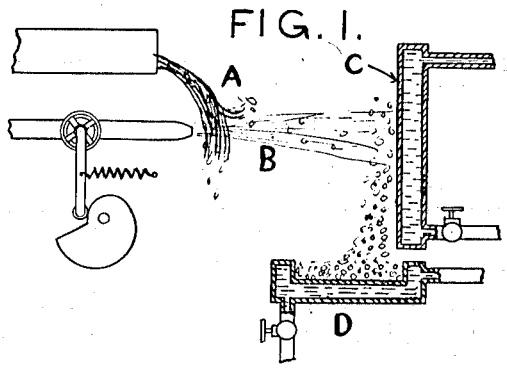
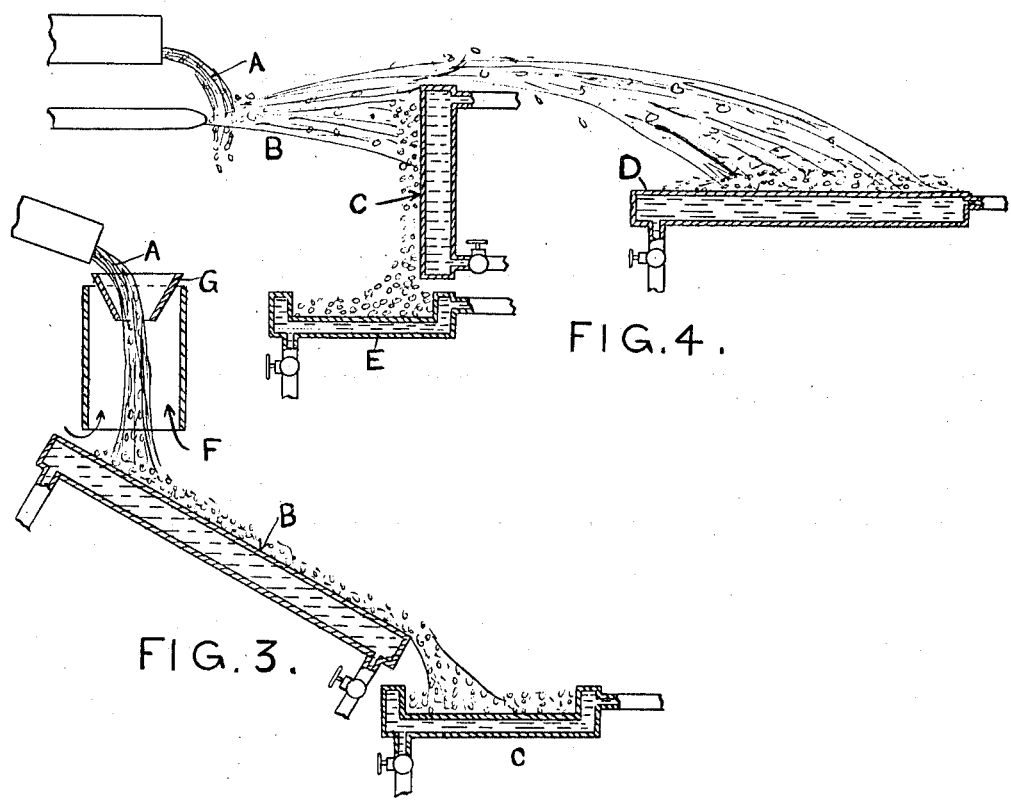

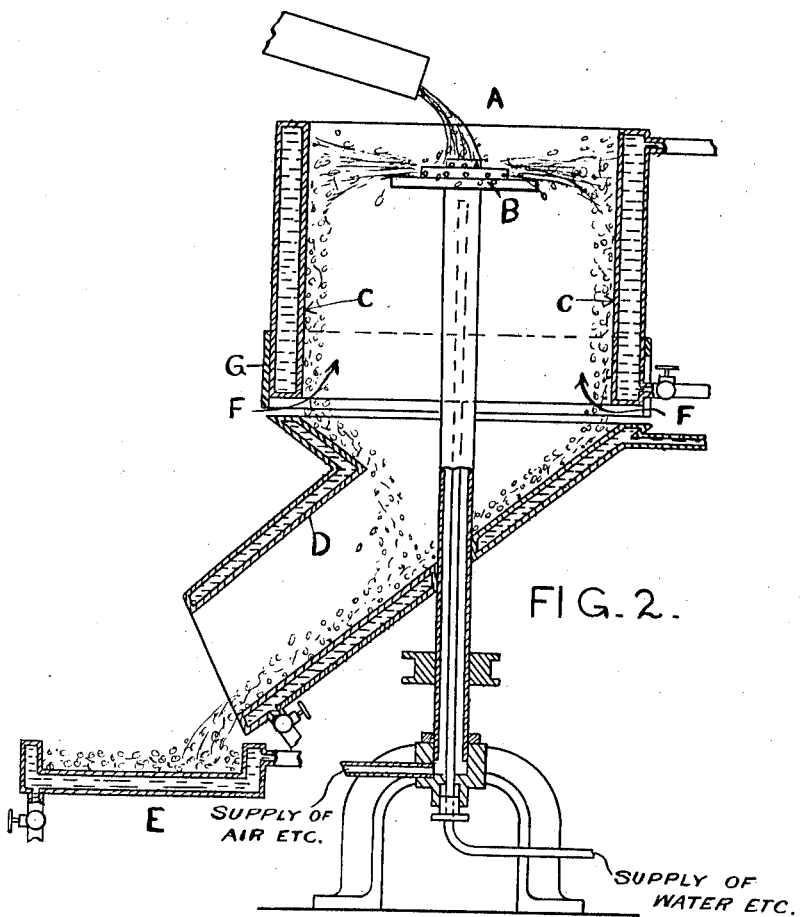

UNITED STATES PATENT OFFICE.

HERMANN PASSOW, OF BLANKANESE, GERMANY, ASSIGNOR, BY MESNE ASSIGNMENTS, TO THE ATLAS PORTLAND CEMENT COMPANY, OF NEW YORK, N. Y., A CORPORATION OF PENNSYLVANIA.

APPARATUS FOR PRODUCING CEMENT.

1,051,844. Specification of Letters Patent. Patented Jan. 28, 1913.

Original application filed January 6, 1903, Serial No. 138,060. Divided and this application filed March 24, 1909. Serial No. 485,376.

*To all whom it may concern:*

Be it known that I, HERMANN PASSOW, chemist, a subject of the German Emperor, now residing at Blankanese, Germany, have made certain new and useful Inventions Relating to Apparatus for Producing Cement, of which the following is a specification, taken in connection with the accompanying drawings, forming part of this application, which is a division of my copending application, 138,060, filed January 6, 1903.

This invention relates to improvements in the treatment of blast furnace slags, or other slags made from artificially melted materials of a similar kind, and relates especially to the production of granulated or pulverized slags in defined chemical or physical conditions necessary for the production of cements, in accordance with my invention described in prior Letters Patent granted to me.

In order to carry out the invention referred to in the hereinbefore mentioned specifications, I have described means of selecting by chemical tests set out therein, the different classes of slags necessary, and dividing such slags into two classes, which are chemically active and chemically inert, under such tests.

This invention relates to the treatment of slag or the like so as to produce at will, positively and certainly, from a single stream of slag, the active and inert varieties in a predetermined manner, or to produce a mixture of the two in suitable proportions.

For the purpose of granulating or disintegrating the slag, I may use any of the known methods, by blast of steam, or air, or gas, or by mechanical means, such as rollers, or centrifugal dispersers, or by allowing the slag to fall through a space, being broken up in its fall, and sufficiently cooled to prevent its aggregation after falling.

In the case of a blast of steam or preferably of air, or of gas, or a mixture of steam and air or gas, I regulate the force of the blast, so as to produce particles of larger or smaller size, so that for the same temperature of the air they cool at a determined rate, depending on the size, and in some cases I arrange for the particles to be projected onto or against a cooling surface, the temperature of which I regulate by means of water or air cooling, so that the cooling effect on the pulverized particles is controlled. I also in certain cases regulate the temperature of the steam or air blast, by all this I arrange a fractional cooling by different stages and degrees.

In the case of mechanical disintegrators, I use the following methods of regulating, viz:—by regulating the temperature of the surface on which the slag first falls, and of the moving or disintegrating part of the machine, by cooling them more or less by means of air or water, and I further modify the condition of the disintegrated slag by regulating the temperature of the air through which the slag is projected, also by the speed at which it is projected as well as by the size of the disintegrated particles, and further, I regulate the final cooling, by the temperature of the surface onto which the disintegrated particles fall. By these means complete control is given of the chemical and physical condition of the disintegrated slag, so as to produce the varieties required for my process of making cement, so that in one apparatus or set of apparatus, the different varieties may be produced ready for mixing.

I now proceed to define the conditions under which by such controlling elements of the apparatus the required states of chemical activity of the slags may be obtained.

In order to produce the chemically inert variety of slag, the disintegrating element by blast or mechanical or gravitational means should be regulated so as to break the molten slag as far as possible into spherical particles, or thin sheets and to cool it as rapidly as possible below a visible heat, preferably without using any water directly in contact. A glassy product is thus produced, which has the property, when ground and mixed with water, of giving little or no rise of temperature when heated with carbonic acid gas, being what I have referred to, as chemically inert.

In order to produce the chemically active variety of slag, the disintegrating element by blast or mechanical or gravitational means, may be regulated as for the former variety, but better results may be obtained by adjusting the pulverizing element so as to break up the slag and produce as far as possible irregular spongy, blistered, friable masses or particles, and the slag must be cooled as quickly as possible, to such a state that it is of about plastic consistency, and from this state the cooling must be continued at a slower rate than for the first mentioned variety, till below a visible temperature. In some cases it is advisable to use with the steam or air blast, either with or without mechanical apparatus or other disintegrators, a certain quantity of water, which however will not be sufficient to wet the product, but only assists by its sudden conversion into gas, the formation of the desired spongy structure. The slag so treated is of a non-glassy and pumiceous structure, and when ground and mixed with water, shows a considerable rise of temperature when treated with carbonic acid gas.

Although I prefer to make the two separate products necessary for my process of making cement at different operations, because thereby, their mixing can be better regulated, in certain cases it is convenient to adjust the disintegration so that a mixture of the two sorts is produced. To effect this, an element of inequality must be introduced, so that the size and structure of the particles produced, may vary, that is with steam or air blasts, the stream of slag must be somewhat irregular in quantity, or rate of flow, or the blast must be of a pulsating nature, and in the case of mechanical disintegrators, the stream of the slag may fall in an irregular manner, upon the moving surface, and may be thrown unequally to different distances, or at different velocities, and in the case of gravitational disintegrators, must pass over the weir or dam face at a varying or irregular rate, sufficient variations in all these cases may usually be obtained by some obstruction to the flow from the source of the slag, so that a surging action is set up in the stream, but positive means may be adopted for achieving this irregularity. For this purpose the apparatus will be regulated intentionally to critical points, where the particles are subjected to different treatment resulting in variation in size, form and structure, the cooling and transformation being above and below a mean point, by which, both glassy and non-glassy slags are produced at the same time in suitable proportions.

Another way of achieving the same result is to let one part of the disintegrated slags fall on a surface of one temperature, and part on a surface at another temperature, so that the secondary cooling is at different rates, or to allow one part of the slags to be conveyed away over cooling surfaces, in a thin layer, while other parts are massed together, and so retain the heat and the secondary cooling is retarded. Or, where the slag particles are projected through the air, I arrest one part of the stream by a cooling surface, at the point where the particles have reached a solid or plastic condition, and I allow the other part to continue passing through the air, till cooled down.

Apparatus for achieving these results, by which the slag or similar molten material may be disintegrated in a molten state and cooled as nearly instantaneously as possible from the fluid condition to a solid or plastic condition and then portions thereof rapidly cooled to form chemically inert material while other portions are slowly cooled to form chemically active material to be mixed together for the direct manufacture of cement, may comprise a pulverizing element capable of being regulated so as to produce particles of defined character and a cooling medium or mediums capable of being regulated as to temperature for the purpose of producing these variations of slag at will or producing both simultaneously. The disintegrator may comprise a blast of steam or of steam and air or gas regulated as to pressure or quantity, or may comprise a mechanical disintegrator or disperser capable of being regulated as to speed so as to produce particles of defined character, a supply of water acting if desired on the still fluid slag so as to open up its structure without permanently wetting it for the purpose of producing the chemically active slag, and a cool receiving surface capable of being regulated as to temperature coöperating with the disintegrating element to receive the particles after they have been projected through the air the temperature of which may be regulated. Apparatus of these descriptions may comprise a means for producing unequal or diverse disintegration and cooling of the slag so that, while the other elements of the apparatus are regulated so as to be maintained constant, both chemically inert and active slags are produced together; and such apparatus may comprise means for arresting one part of the projected particles by a regulated cooling surface while the rest of the particles after being projected farther are received on another cooling surface.

Having now described the nature of my invention, I proceed to illustrate by diagrams in the accompanying drawings various methods of carrying out the same.

Figure 1 is an elevation partly in section showing diagrammatically an illustrative jet apparatus. Fig. 2 is a similar view showing an illustrative rotary disintegrator apparatus. Fig. 3 similarly shows a cooling tower apparatus; and Fig. 4 similarly shows another form of jet disintegrating apparatus.

Fig. 1 shows A, a stream of slag which in falling is met by a jet of steam or air or gas, B, and pulverized and thrown against the water cooled surface C, falling into a water cooled conveyer D. By the regulation of the force of the jet B, the temperature of C and the temperature of D the size of the particles and their rate of cooling is determined.

Fig. 2 shows a stream of slag A, falling on to a mechanical disintegrator. B, a water cooled revolving spindle throwing the pulverized slag against the water cooled walls C whence they fall down the water cooled chute D into the water cooled conveyer E. By regulating the temperature of these surfaces, as well as the velocity of the cone B, and the temperature of the air entering at F, by adjusting the sleeve G, the required regulation of the cooling is effected. In certain cases the revolving spindle B may be supplied with air which issues from a series of holes in the cone B and may be supplied with water in small quantities to assist by its sudden conversion into steam, the production of the required structure of the slag.

Fig. 3 shows at A, a stream of slag falling over a weir and having sufficient height to be partially cooled in falling, and falling on a water cooled surface B and into a water cooled conveyer C, by the regulation of the temperature of these elements, and of the air passing through F by adjusting the cone G the necessary regulation of the cooling may be obtained.

Fig. 4 shows an arrangement where one part of the slag is arrested by a cooling surface and the other part is allowed to continue passing through the air till cooled down. A is the slag stream, B is a jet of steam or air or gas or a mixture of them, or other pulverizing device, C is a cooling surface arresting part of the projected particles, which fall on the water cooled conveyer E. D is a cooling surface receiving the other part of the projected particles.

In the case of Fig. 1 the two sorts of slags that is, active and inactive, may be produced at the same time when the stream of slag A is of a variable or surging nature, or the blast B may by means of a motion given mechanically to the valve regulating it, be made to vary in its force as shown in a valve operating lever and cam in Fig. 1, and by these means particles of varying size are produced which cool at different rates, or the surface C may be placed horizontally, so that the particles travel a different distance, and lie on the surface in layers of different thickness to cool.

In the case of mechanical disintegrators of the class shown in Fig. 2, the same irregularity of the flow may be used to produce a difference in the size of the particles, or the stream instead of falling centrally on the cone B, may fall partly centrally, and partly on a radial line, so that the slags meet surfaces traveling at different velocities and so are thrown at different speeds through the air onto the cooled walls, and finally reach the conveyer in different states of cooling.

In the case of gravitational coolers of the type shown in Fig. 3, a variable or surging flow of slag will produce the same results so as to give different sized, and differently cooled, slags, falling on the cooling surface B.

It will be understood that I do not confine myself to the particular arrangements shown in Figs. 1, 2, 3, which are merely descriptive each of a class of apparatus by which I carry out the cooling of slags in the particular manner necessary for my invention.

It will be understood by those familiar with this art that many modifications may be made in the form, size, proportions and numbers of parts of this apparatus. Further, parts of this apparatus may be used without employing the whole and parts may be used in connection with other devices without departing from the spirit of this invention or losing the advantages of the same. I do not, therefore, desire to be limited to the details of the disclosure which has been made in this case, but

What I claim as new and desire to secure by Letters Patent is set forth in the appended claims:

1. In cement apparatus, a rapidly rotating disintegrator provided with discharge apertures in its periphery, water-cooled walls around said disintegrator to intercept the slag particles, means to feed molten slag upon said disintegrator to be thereby disintegrated into particles and thrown out through the surrounding air into impingement with said walls, means to discharge air through said apertures and means to discharge a small quantity of water through said apertures to contact with said slag at the time of its disintegration and assist the production of irregular spongy masses or particles comprising active cement material free from undesirable hydration.

2. In cement apparatus, a rotating disintegrator provided with discharge apertures in its periphery, cooled walls around said disintegrator to intercept the slag particles, means to feed molten slag to said disintegrator to be thereby disintegrated into particles and thrown out through the surrounding fluid medium into engagement with said walls and means to discharge aqueous treating fluid through said apertures to contact with said slag at the time of its disintegration and assist the production of irregular spongy masses or particles free from undesirable hydration.

3. In cement apparatus, a rotary disintegrator provided with discharge apertures, a receiving wall adjacent said disintegrator to intercept slag particles therefrom, means to feed highly heated slag material to said disintegrator to be thereby disintegrated and thrown out through the surrounding fluid medium into engagement with said receiving wall and means to discharge aqueous treating liquid through said apertures to contact with said slag material and assist the production of irregular spongy masses or particles comprising active cement material.

4. In cement apparatus, a rotary disintegrator provided with discharge apertures, means to receive the slag particles from said disintegrator, means to feed highly heated slag material to said disintegrator to be thereby disintegrated into particles and thrown out through the surrounding fluid medium and means to discharge aqueous treating fluid through said apertures to contact with said slag and assist the production of irregular spongy masses or particles comprising active cement material.

5. In cement apparatus, a rotary disintegrator, means to receive slag material from said disintegrator, means to feed highly heated slag material upon said disintegrator to be thereby disintegrated into particles and thrown out through the surrounding fluid medium and means to feed aqueous treating liquid into contact with said slag at substantially the time of its disintegration to assist the production of spongy masses or particles free from undesirable hydration.

6. In cement apparatus, a rotary disintegrator, means to receive slag material from said disintegrator, means to feed substantially molten slag to said disintegrator to be thereby disintegrated and thrown out through the surrounding fluid medium, and means to discharge aqueous treating fluid into contact with said slag material at substantially the time of its disintegration to assist the production of spongy masses or particles free from undesirable hydration.

7. In cement apparatus, a rotary disintegrator, a receiving wall located adjacent said disintegrator to intercept slag particles therefrom, means to feed substantially molten furnace slag to said disintegrator to be thereby disintegrated and thrown out through the surrounding fluid medium into engagement with said receiving wall to produce irregular or spongy masses or particles comprising active cement material.

8. In cement apparatus, a disintegrator, a cooled receiving wall coöperating with said disintegrator to intercept slag particles therefrom, means to feed molten slag to said disintegrator to be thereby disintegrated into particles and thrown out through the surrounding fluid medium into engagement with said wall and means to discharge aqueous treating liquid into contact with said slag material at substantially the time of its disintegration to assist the production of spongy masses or particles comprising active cement material.

9. In cement apparatus, disintegrating means, means to feed substantially molten slag to said disintegrating means to be thereby disintegrated and thrown out through the surrounding fluid medium and means to discharge regulated quantities of aqueous treating liquid into contact with said slag material at substantially the time of its disintegration to assist the production of spongy masses or particles free from undesirable hydration.

10. In cement apparatus, disintegrating means, means to receive slag material therefrom, means to feed highly heated slag material to said disintegrating means to be thereby disintegrated and thrown out through the surrounding fluid medium and means to discharge regulated quantities of aqueous treating liquid into contact with said slag at substantially the time of its disintegration to assist the production of spongy masses or particles free from undesirable hydration.

11. In cement apparatus, a rotating disintegrator provided with discharge apertures in its periphery, cooled walls around said disintegrator to intercept the slag particles discharged therefrom, means to feed molten furnace slag to said disintegrator to be thereby disintegrated into particles and thrown out through the surrounding fluid medium into engagement with said walls, a supply of aqueous treating fluid and means to discharge the same through said apertures in said disintegrator to contact with said slag at the time of its disintegration and assist the production of irregular spongy masses or particles free from undesirable hydration.

12. In cement apparatus, a rotary disintegrator provided with discharge apertures, a receiving wall adjacent said disintegrator to intercept slag particles therefrom, means to feed highly heated slag material to said disintegrator to be thereby disintegrated and thrown out through the surrounding fluid medium into engagement with said receiving wall, a supply of aqueous treating fluid and means to discharge a small quantity thereof through said apertures to contact with said slag material and assist the production of irregular spongy masses or particles free from undesirable hydration.

13. In cement apparatus, a rotary disintegrator, means to receive slag material from said disintegrator, means to feed highly heated slag material to said disintegrator to be thereby disintegrated into particles and thrown out through the surrounding fluid medium, a supply of aqueous treating fluid and means to feed said aqueous treating fluid into contact with said slag at substantially the time of its disintegration to assist the production of spongy masses or particles free from undesirable hydration.

14. In cement apparatus, a rotary disintegrator, means to receive slag material from said disintegrator, means to feed substantially molten slag to said disintegrator to be thereby disintegrated and thrown out through the surrounding fluid medium, a supply of aqueous treating fluid and means to discharge regulated quantities of said aqueous treating fluid into contact with said slag material at substantially the time of its disintegration to assist the production of spongy masses or particles free from undesirable hydration.

15. In cement apparatus, a disintegrator, cooled receiving means to receive slag material discharged from said disintegrator, means to feed molten slag to said disintegrator to be thereby disintegrated into particles and thrown out through the surrounding fluid medium into engagement with said receiving means, a supply of aqueous treating fluid and means to discharge regulated quantities thereof into contact with said slag material at substantially the time of its disintegration to assist the production of spongy masses or particles comprising active cement material.

16. In cement apparatus, a disintegrator, means to receive slag material therefrom, means to feed highly heated slag material to said disintegrator to be thereby disintegrated and thrown out through the surrounding fluid medium, a supply of aqueous treating fluid and means to discharge regulated quantities of said aqueous treating fluid into contact with said slag material at substantially the time of its disintegration to assist the production of spongy masses or particles free from undesirable hydration.

17. In cement apparatus, disintegrating means, means to feed highly heated slag material to said disintegrating means to be thereby disintegrated and thrown out through the surrounding fluid medium, a supply of aqueous treating fluid and means to discharge regulated quantities of said aqueous treating fluid into contact with said slag material at substantially the time of its disintegration to assist the production of spongy masses or particles free from undesirable hydration.

18. The combination of a hollow perforated rotatable body provided with perforations and increasing in diameter downwardly, a hollow axle communicating with said body and adapted to connect it with a supply of compressed air, and means for conveying material on top of said body.

19. The combination of a rotatable hollow body provided with perforations, a hollow axle communicating with said body and adapted to connect it with a supply of compressed air, and a conduit for dropping molten material on said body.

20. The combination of a rotatable body having a plurality of steps at different levels, the lower steps being of greater diameter than the upper steps, and a conduit for conveying molten material to said body.

21. In cement apparatus, a rotating disintegrator provided with discharge apertures in its periphery, cooled walls around said disintegrator to intercept the slag particles discharged therefrom, means to feed molten furnace slag to said disintegrator to be thereby disintegrated into particles and thrown out through the surrounding fluid medium into engagement with said walls, a supply of treating fluid and means to discharge the same through said apertures in said disintegrator to contact with said slag at the time of its disintegration and assist the production of irregular spongy masses or particles free from undesirable hydration.

22. In cement apparatus, a rotating disintegrator, cooled walls around said disintegrator to intercept the slag particles discharged therefrom, means to feed molten furnace slag to said disintegrator to be thereby disintegrated into particles and thrown out through the surrounding fluid medium into engagement with said walls to assist the production of irregular spongy masses or particles free from undesirable hydration and comprising considerable proportions of active cement material.

23. In cement apparatus, a rotary disintegrator provided with discharge apertures, a receiving wall adjacent said disintegrator to intercept slag particles therefrom, means to cool said receiving wall, means to feed highly heated slag material to said disintegrator to be thereby disintegrated and thrown out through the surrounding fluid medium into engagement with said receiving wall, a supply of treating fluid and means to discharge a small quantity thereof through said apertures to contact with said slag material and assist the production of irregular spongy masses or particles free from undesirable hydration.

24. In cement apparatus, a rotary disintegrator, a receiving wall adjacent said disintegrator to intercept slag particles therefrom, means to feed highly heated slag material to said disintegrator to be thereby disintegrated and thrown out through the surrounding fluid medium into engagement with said receiving wall to assist the production of irregular spongy masses or particles free from undesirable hydration and comprising considerable proportions of active cement material.

HERMANN PASSOW.

Witnesses:
ERNEST H. L. MUMMENHOFF,
OTTO W. HELLMRICH.